July 6, 1943.  W. C. LANDON  2,323,815

OIL CONTROL PISTON RING

Filed July 3, 1939

INVENTOR.
William Charles Landon
BY
Louis Quarles
ATTORNEY.

Patented July 6, 1943

2,323,815

UNITED STATES PATENT OFFICE 2,323,815

OIL CONTROL PISTON RING

William Charles Landon, Wausau, Wis., assignor to Wausau Motor Parts Co., Wausau, Wis., a corporation of Wisconsin Application July 3, 1939, Serial No. 282,624

2 Claims. (Cl. 309—45)

This invention relates to piston rings and resides in a novel composite ring made up of a pair of spaced, relatively flat, oil-controlling ring members or segments which present narrow edges to the cylinder wall and which have a relatively low coefficient of thermal expansion, the same being held in spaced relation by a thermal-regulating spacer having a relatively high coefficient of expansion, the composite ring being in use assembled within a piston groove backed by a resilient backing spring.

Heretofore it has been well known, particularly in the case of worn or over-sized cylinders, that improved control of lubricating oil utilization may be obtained from a pair of spaced, relatively flat, steel, oil-control rings or segments carried on each side of the piston ring groove, with a cast-iron spacer member therebetween provided with oil-relief passages and with a backing spring urging the segments against the cylinder wall. The beneficial result derived from a ring assembly of this type is dependent, in part at least, upon the narrow oil wiping contact which exists between the cylinder wall and the relatively narrow edges of the flat, steel oil-control members. When such a ring is operating as intended, good results are experienced, but the wiping action required lies close to the point where there is danger of excessive stripping of the required lubricant film from the cylinder wall, whereupon an abnormal temperature rise, due to friction, follows and damage to the engine may ensue.

It is the discovery of this invention that a composite ring of the type above mentioned may be constructed which is possessed of all of the advantages of this type and at the same time possessed of properties which prevent the occurrence of the undesirable condition above noted.

This invention is herein described by reference to specific embodiments thereof which are set forth by way of illustration and not of limitation, the description being set forth with the aid of the accompanying drawing forming a part hereof and in which.

Figure 1:
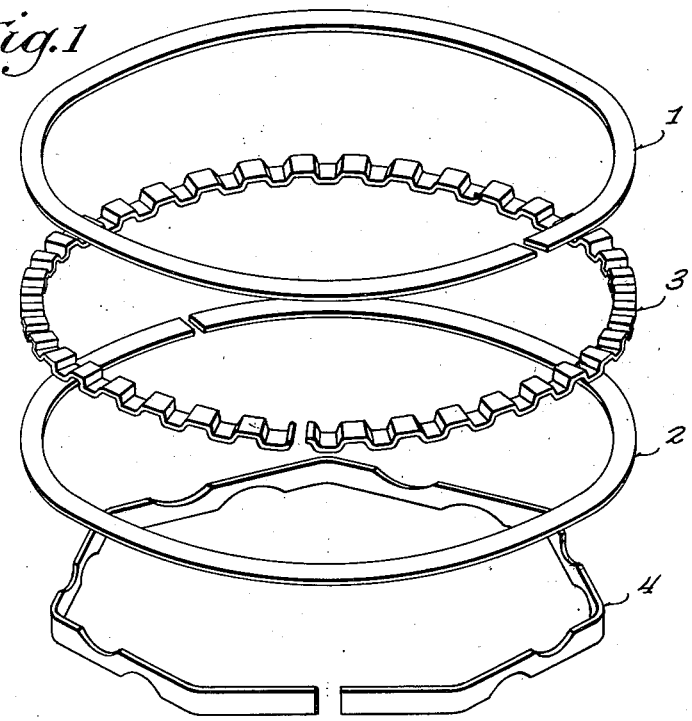
Fig. 1 is an expanded view, in perspective, showing the several parts which go together to make up one form of the ring of this invention.
Figure 3:
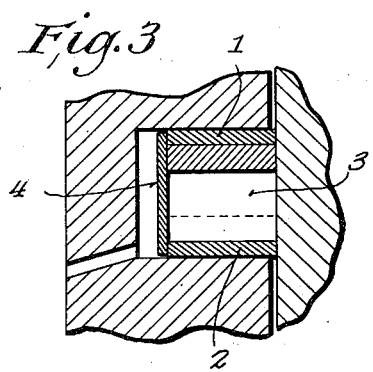
Fig. 3 is a detail view in section of a portion of the ring shown in Fig. 2, the same being shown in position in a piston groove in contact with a cylinder wall.

As shown in Fig. 1, one form of the piston ring of this invention may be made up of a pair of relatively flat upper and lower oil-control members of steel or other suitable material of relatively low thermal coefficient of expansion, designated, respectively, by the numerals 1 and 2. The oil-control members 1 and 2 may be identical in form and may be made with a gap therein, as shown, to permit assembly thereof in the piston groove. Between the upper and lower oil-control members there is provided a spacer member 3, made in the form shown in the drawing from resilient copper, or a resilient alloy of copper, such as phosphor bronze, brass, bronze, copper-beryllium alloy, and the like, or of other suitable alloy having a relatively high coefficient of expansion. The spacer member 3 is preferably made of relatively thin rolled strip material circumferentially corrugated with closely spaced corrugations having an amplitude exceeding the combined axial thickness of the upper and lower oil control members, thus providing oil relief passages of maximum area. The effective axial thickness of the spacer is carefully dimensioned so that the assembled ring, including the upper and lower members 1 and 2, fills the ring groove with a proper fit, as shown more clearly in Fig. 3. Due to the corrugated character of this member it exhibits some axial resilience, which helps to hold the assembled parts of the ring in contact with the sides of the piston ring groove. Further, it will be noted that the exterior peaks of the circumferential corrugations are flattened so that a substantial bearing area between spacer 3 and the side members 1 and 2 is provided. This minimizes wear. In addition, the radial depth of spacer member 3 is dimensioned to equal the radial depth of the upper and lower members 1 and 2 at normal running temperatures.

Within the assembled members 1, 2, and 3, and bearing alike against the inner surfaces of each, there is placed a backing spring 4, the same being in the usual form for a backing spring, as shown in Fig. 1.

The improved performance obtainable from a ring constructed in accordance with this invention seems to be attributable to the employment of a spacer composed of a material different from that of the oil-control segments and having a thermal coefficient of friction greater than that of the oil-control segments. Copper and alloys containing copper as a major constituent are well adapted for use as spacer material, since the same have a thermal-coefficient of expansion in excess of that of steel, which may be conveniently employed in the oil-control segments. In addition, copper and its alloys are possessed of the property of moving against cast-iron surfaces with a lower coefficient of friction than that of steel, particularly under conditions where the lubricating film has been reduced to a substantial degree, and this is true to some measure in the case of all metals having a relatively high thermal coefficient of expansion. By reason of this property, whenever the condition arises where oil-control members 1 and 2 have deprived the cylinder wall of a sufficient lubricant film, the temperature of the ring assembly, including the spacer 3, immediately rises. When this occurs the members 1 and 2 are automatically and promptly relieved of the pressure of the backing spring 4, by reason of the fact that the radial dimension of spacer 3, due to the higher coefficient of expansion of the material thereof, increases beyond the radial dimension of the upper and lower oil-control members 1 and 2. Due to this action of the ring of this invention, any self-accumulating tendency of the temperature to rise is immediately checked by reason of the increased bearing area or improved friction coefficient, or both, between the spacer material and the cylinder wall, and this protecting effect is maintained until normal running temperature of the cylinder wall and piston parts becomes reestablished. The use of spacers made of cast-iron or steel in conjunction with steel oil-control segments does not permit of obtaining this beneficial action, since the expansion coefficients for these materials are too low. Likewise, rings which use a spacer having a radial depth less than that of the control segments do not have the desired action, regardless of the materials employed.

Figure 2:
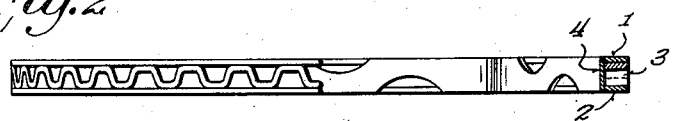
Fig. 2 is a side elevation with portions shown in section of a ring assembled from the parts set forth in Fig. 1.
Figure 4:
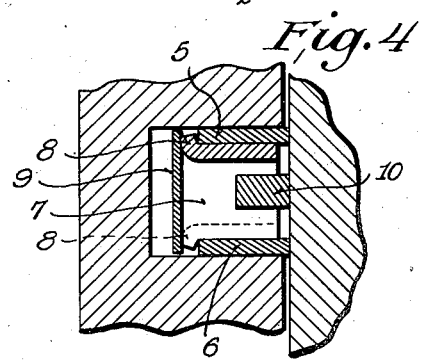
Fig. 4 is a detail view in section of another form of the ring of this invention shown in position in a piston groove in contact with a cylinder wall.
Figure 5:
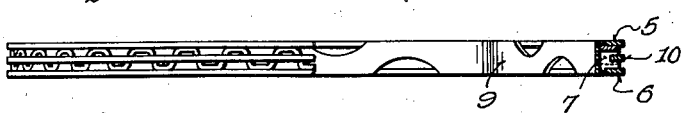
Fig. 5 is a side elevation, with parts in section, of the ring shown in Fig. 4.

Another form of the ring of this invention is shown in Figs. 4 and 5. In this form of the ring the upper oil-control member 5 and a lower oil-control member 6 are employed between which there is placed a spacer member 7, corrugated as shown in Fig. 5, to provide axial resilience. In addition, the spacer member 7 is provided with upwardly and downwardly displaced ears 8, which engage the inner edges of upper and lower oil-control members 5 and 6 so as to provide controlled radial movement between the spacer 7 on one hand and the oil-control members 5 and 6 on the other hand. A conventional backing spring 9 is provided, which bears against the inner face of spacer 7. To obtain the desired thermal response of this invention, a regulating ring 10 is placed in a peripheral groove provided therefor in the spacer 7. The regulating ring 10 is composed of a material of relatively high coefficient of expansion, such as a material which contains copper as a major constituent. It will be readily apparent that whenever an abnormal temperature rise of the ring assembly shown in Fig. 4 occurs, expansion of member 10 will run beyond the effective expansion of members 5 and 6 and the stress of the backing spring 9 will be borne by the regulating member 10. In this way the self-protecting action described above in connection with the form of ring shown in Figs. 1, 2, and 3, will take place in the form of the ring of this invention shown in Figs. 4 and 5. The latter form of ring has certain advantages under certain conditions of use, particularly inasmuch as the effect of wear upon the backing spring 9 has less bearing upon the functioning of the ring as a whole, by reason of the limitation of relative radial movement of the various parts of the ring.

While the ring of this invention has been above described by reference to certain specific instances of embodiments thereof, it is intended that the protection of Letters Patent to be granted hereon be not unnecessarily limited thereby, but that such protection extend to the substance of the advance as presented by the disclosure above set forth and as defined in the claims hereto appended.

That which I claim as my invention and wish to secure by Letters Patent is:

1. In a composite piston ring of the class described, a pair of spaced relatively thin side segments, a spacer segment interposed between said side segments formed of a thin circular ribbon of crimped resilient material, the crimping being of such form that the ribbon follows circumferentially an angularly corrugated pattern in which said ribbon passes along parallel to and in contact with the inside face of one of said side segments for a substantial distance to form a land, then bends sharply away from said side segment and passes in a nearly axial direction toward the inside face of the other of said side segments where it again bends sharply so as to pass along parallel to and in contact with the inside face of said other side segment for a substantial distance to form a land and then bends sharply to pass in a nearly axial direction toward the inside face of said first-mentioned side segment, said passes and bends being repeated substantially throughout the circumference of said spacer to form said angularly corrugated pattern, the circumferential lengths of said individual lands and the circumferential lengths of the gaps between said successive lands in contact with one of the segments being in the neighborhood of the distance between said side segments and the circumferential lengths of complete corrugations being in the neighborhood of two times the distance between the side segments, and a backing spring behind said side segments and spacer for urging the same outwardly.

2. In a composite piston ring of the class described, a pair of spaced relatively thin steel side segments, a spacer segment interposed between said side segments formed of a thin circular ribbon of crimped resilient material having a thermal coefficient of expansion exceeding that of said side segments, the radial depth of said ribbon being approximately equal to the radial depth of said side segments, the crimping of said ribbon being of such form that the ribbon follows circumferentially an angularly corrugated pattern in which said ribbon passes along parallel to and in contact with the inside face of one of said side segments for a substantial distance to form a land, then bends sharply away from said side segment and passes in a nearly axial direction toward the inside face of the other of said side segments, where it again bends sharply so as to pass along parallel to and in contact with the inside face of said other side segment for a substantial distance to form a land and then bends sharply to pass in a nearly axial direction toward the inside face of said first-mentioned side segment, said passes and bends being repeated substantially throughout the circumference of said spacer to form said angularly corrugated pattern, the circumferential lengths of said individual lands and the circumferential lengths of the gaps between said successive lands in contact with one of the segments being in the neighborhood of the distance between said side segments and the circumferential lengths of complete corrugations being in the neighborhood of two times the distance between the side segments, and a backing spring behind said side segments and spacer for urging the same outwardly.

WILLIAM CHARLES LANDON.